(12) United States Patent
Mere et al.

(10) Patent No.: US 8,738,200 B2
(45) Date of Patent: May 27, 2014

(54) ON-BOARD FLIGHT STRATEGY EVALUATION SYSTEM ABOARD AN AIRCRAFT

(75) Inventors: Jean-Claude Mere, Verfeil (FR); Julien Dramet, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 507 days.

(21) Appl. No.: 13/017,509

(22) Filed: Jan. 31, 2011

(65) Prior Publication Data

US 2011/0208376 A1    Aug. 25, 2011

(30) Foreign Application Priority Data

Feb. 24, 2010   (FR) ...................................... 10 51318

(51) Int. Cl.
*G06F 7/70* (2006.01)
(52) U.S. Cl.
USPC .......................................................... 701/14
(58) Field of Classification Search
USPC .......................................................... 701/14
See application file for complete search history.

(56) References Cited

U.S. PATENT DOCUMENTS 5,121,325 A    6/1992   DeJonge

FOREIGN PATENT DOCUMENTS

FR          2 916 842 A1    12/2008
WO    WO 2006/085952 A1     8/2006

OTHER PUBLICATIONS

European Search Report issued Jun. 27, 2011, in Patent Application No. 11 15 3708 (with English Translation of Category of Cited Documents).
U.S. Appl. No. 13/015,008, filed Jan. 27, 2011, Mere, et al.

*Primary Examiner* — Maceeh Anwari
(74) *Attorney, Agent, or Firm* — Oblon, Spivak, McClelland, Maier & Neustadt, L.L.P.

(57) ABSTRACT

The invention relates to a process and an on-board system for evaluating flight strategies aboard an aircraft, linked with a flight plan (13) of the aircraft, including:

calculation means (5) for determining relations between the flight parameters including parameters of time, of fuel quantity, of altitude and of speed, interface means (9) for providing at least one envelope of values (25*a*-25*d*) representative of a domain of definition of a plurality of flight strategies, interface means (9) for providing at least one determined strategy defined by determined values assumed by the flight parameters at a reference point, interface means (9) to allow the selection and setting of the value of a first parameter among said flight parameters, generating and supplying another envelope of values allowing exploration of another plurality of possible strategies, and interface means (9) to allow the selection and setting of the value of a second parameter, generating and supplying another determined strategy.

10 Claims, 3 Drawing Sheets

ON-BOARD FLIGHT STRATEGY EVALUATION SYSTEM ABOARD AN AIRCRAFT

TECHNICAL FIELD

The present invention relates to the field of on-board systems aboard an aircraft and more particularly to an on-board evaluation system linked to the flight plan for evaluating different potential flight strategies.

PRIOR STATE OF THE ART

An aircraft is generally provided with a flight management system (FMS) which allows the crew to file, before the flight, a flight plan consisting of a series of waypoints. From this flight plan, the flight management system calculates and displays on a screen the different flight parameters, including the parameters of time, fuel quantity, altitude and speed throughout the flight plan.

Current flight management systems offer the possibility of evaluating strategy changes over the remainder of the flight by allowing the crew either to change the parameters of the flight path (speed and altitude) or to specify constraints (altitude, speed or planned time of arrival) throughout the flight plan.

These changes are carried out on a copy (called a "temporary" or "secondary" flight plan) of the active flight plan, and the flight management system recalculates the predictions (estimated transit time and fuel remaining) over the points in this new flight plan. This allows the crew to evaluate the effects produced by the strategy change thus modeled in the flight management system on the objectives for arrival time and fuel remaining at destination.

The changes my be relatively complicated, including several altitude and/or speed changes with potentially several constraints at different points on the flight plan. Modeling these changes in a flight plan, however, brings about several limitations.

A first limitation concerns the fact that the crew can evaluate only one strategy at a time. This forces it, if it is to compare several strategies to identify the most advantageous one, to carry out several modifications of its flight plan and to store in memory or take note of the effects corresponding to each strategy tested so as to be able to make the comparison. These effects relate, for example, to the quantity of fuel remaining at destination or "EFOB" (Estimated Fuel On Board) and the time of arrival at destination or "ETA" (Estimated Time of Arrival).

Another limitation concerns the fact that the calculation of predictions throughout the amended flight plan can take several minutes, depending on the changes made, which, in the event that the pilot wishes to evaluate several strategies, can become prohibitive, especially if the crew must make a quick decision.

Furthermore, current flight management systems do not allow constraints to be entered regarding the quantity of fuel available at a point in the flight plan.

Finally, when the crew wish to evaluate the effect of a constraint on speed, or on the time for transiting a waypoint in the flight plan, on the objectives of fuel quantity remaining or arrival time at destination, current flight management systems allow calculation of the strategy satisfying this constraint only on the basis of the altitude profile considered, which does not necessarily represent the optimal solution.

The object of the present invention is to propose a simple and accurate on-board system that corrects the aforementioned disadvantages, in particular by allowing the crew to quickly evaluate several possible flight strategies without requiring that the current flight plan be changed.

DISCLOSURE OF THE INVENTION

The present invention is defined by an on-board flight strategy evaluation system aboard an aircraft, linked to an aircraft flight plan, the system including:
  calculation means for determining the relations between the flight parameters including parameters of time, fuel quantity, altitude and speed by establishing correlations between transit time and fuel quantity at waypoints of said flight plan according to different speed and altitude profiles,
  interface means for providing at least one envelope of values of said flight parameters at least one reference point among said waypoints, said envelope of values being representative of a domain of definition of a plurality of flight strategies,
  interface means for providing at least one determined strategy defined by the determined values assumed by the flight parameters at the at least one reference point,
  interface means allowing the selection and setting of the value of a first parameter among said flight parameters generating and providing another envelope of values of said flight parameters allowing the exploration of another plurality of possible strategies, and
  interface means to allow the selection and setting of the value of a second parameter, in addition to said first parameter, generating and providing another determined strategy.

The invention allows a plurality of possible flight strategies (calculated with respect to the aircraft's performance) to be quickly provided without necessitating either a change in the current flight plan or a secondary or temporary flight plan. Thus, the aircraft crew can quickly and easily choose an optimal strategy by comparing the effects (parameter values) of the different potential strategies. More particularly, the invention allows the crew to be provided with the information that they need to decide a change in flight strategy by evaluating the different possibilities presented to select the strategy best suited to the continuation of the flight so as, for example, to retrieve a discovered delay or to make the best use of the available fuel supply considering the events that they have dealt with during the first part of the flight. For example, the crew can quickly evaluate several altitude profiles and choose the flight strategy that allows the specified constraints on speed or transit time at a waypoint or fuel remaining at destination.

It should be noted that the reference point can correspond to the aircraft's destination, selected for example by default by the online system, or to any point on the route selected by the crew.

Advantageously, the calculation means determine the envelope of values of said flight parameters dynamically according to the aircraft's progress along the flight plan.

Thus, the envelope of values is not fixed and evolves with time to take into account the restriction of potential strategies as the aircraft gradually approaches its destination.

According to a first embodiment, the calculation and interface means are configured to automatically select and set said first flight parameter depending on the specifics of the flight plan.

According to a second embodiment, the interface means are configured to allow a crew of the aircraft to select and set said first and/or said second flight parameter.

Advantageously, the interface means are configured so that the first parameter selected and set corresponds to any one of the parameters corresponding to the altitude and the speed of the aircraft along said flight plan, and the interface means are further configured so that the second parameter selected and set corresponds to any other of said parameters corresponding to altitude and speed, allowing a strategy for a transit time and a quantity of fuel remaining to be supplied at said at least one reference point, satisfying the set values of altitude and speed along said flight plan.

Advantageously again, the interface means are configured so that the first parameter selected and set corresponds to any one of the parameters corresponding to a transit time and a quantity of fuel remaining at said at least one reference point, and the interface means are further configured so that the second parameter selected and set corresponds to any other of said parameters corresponding to said transit time and to said quantity of fuel remaining at the same reference point or at another point, allowing a strategy to be provided regarding a profile of the parameters corresponding to the speed and altitude of the aircraft that satisfies the set values of transit time and quantity of fuel remaining at said at least one reference point. It will be noted that it is possible to specify one reference point for transit time and another reference point for quantity of fuel remaining.

According to a particular embodiment, the interface means are configured to allow selection of a pre-defined strategy in which the selection and setting of the values of the first and second parameters are predetermined, said pre-defined strategy being selected from among the following pre-defined strategies:
 a first strategy of minimizing operational cost depending on a predetermined cost index,
 a second strategy of minimizing flight time depending on the fuel available on board,
 a third strategy of maximizing range,
 a fourth strategy compromising range and fuel savings, and
 a fifth strategy minimizing fuel consumption per nautical mile.

Advantageously, the interface means include a selection means for selecting said at least one reference point and input-output means associated with the flight parameters corresponding to the altitude, the speed, the transit time and the quantity of fuel remaining at said at least one selected reference point, each of said input-output means including an interval of values of the corresponding parameter and a cursor configured to set or mark a value within said interval, the intervals of the corresponding parameters forming said envelope of values of said parameters, so that when a cursor is operated to set the value of a first parameter, the intervals associated with the other parameters are modified accordingly to define said other envelope of values which can be assumed by the other parameters.

As a variation, two of said input-output means consist of a dual scale on which the index is configured to mark/display the time of transit at the reference point and to display/mark the quantity of fuel corresponding to a speed-altitude strategy determined to be optimal.

The invention also concerns a flight strategy evaluation process linked with a flight plan aboard an aircraft, the process including the following steps:
 determining the relations between flight parameters including parameters of time, of fuel quantity, of altitude and of speed by establishing correlations between transit time and fuel quantity at waypoints of said flight plan according to different profiles of speed and altitude,
 supplying at least one envelope of values of said flight parameters at least one reference point among said waypoints, said envelope of values being representative of a domain of definition of a plurality of flight strategies,
 supplying at least one determined strategy defined by determined values assumed by the flight parameters at said at least one reference point,
 selecting and setting the value of a first parameter among said flight parameters, generating and supplying another envelope of values of said flight parameters allowing another plurality of possible strategies to be explored, and
 selecting and setting the value of a second parameter, in addition to said first parameter, generating and supplying a second determined strategy.

DETAILED DISCLOSURE OF PARTICULAR EMBODIMENTS

Figure 1:
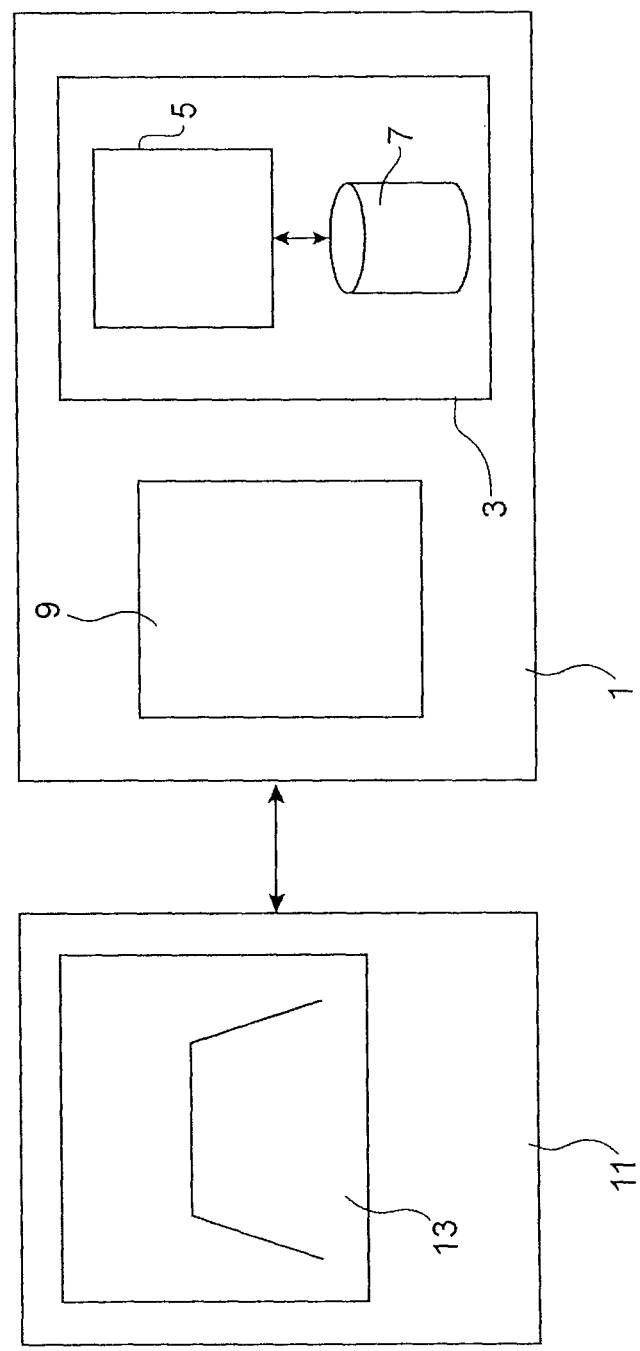
FIG. 1 represents an on-board evaluation system according to the invention.

FIG. 1 illustrates schematically an on-board flight strategy evaluation system 1 which can be used to provide and quickly evaluate a plurality of possible strategies, allowing the crew to select an optimal strategy by comparing the effects of the different strategies, according to the invention. It will also be noted that FIG. 1 is also an illustration of the evaluation process, according to the invention.

The on-board evaluation system 1 includes processing means 3 including calculation means 5 and storage means 7, as well as interface means 9. The interface means 9 can correspond to an interactive display screen already existing aboard the aircraft. It will be noted that the on-board evaluation system 1 can consist of an entity separate from the other systems of the aircraft. As a variation, it may be included, totally or in part, in another on-board system. For example, the on-board evaluation system 1 can be included in the aircraft's flight management system (FMS) 11.

Advantageously, the on-board evaluation system 1 is coupled to the flight management system 11 to be linked with the flight plan 13 which indicates the routing of the aircraft. The flight management system 11 defines the different phases of flight as well as the parameters of time, fuel quantity, altitude and speed along the flight plan.

The on-board evaluation system 1 is configured to determine and present to the crew information that they need to decide an in-flight change in strategy by evaluating the different possibilities offered to them to retrieve, for example, a discovered delay or to make the best use of the fuel supply available to it considering the events that they had to deal with during the first part of the flight.

The principle of the solution proposed by the present invention consists of dynamically calculating an envelope of values of the flight parameters (for example, times of transit and the quantity of fuel remaining at destination or at any reference point in the flight plan) considering the current condition of the aircraft, the route to be followed, the quantity of fuel available, the different possible flight strategies and possible constraints at certain points in the selected route. The information corresponding to the different flight strategies are presented to the crew synthetically in such a way that there is no need to modify the active flight plan (upon which the aircraft is directed) in the flight management system to select the strategy best suited to the continuation of the flight.

In conformity to the invention, calculation means 5 of on-board evaluation system 1 are configured to determine the relations between the parameters of time, fuel quantity, altitude and speed by establishing correlations between transit time and fuel quantity at waypoints in the flight plan according to different speed and altitude profiles.

Figure 2:
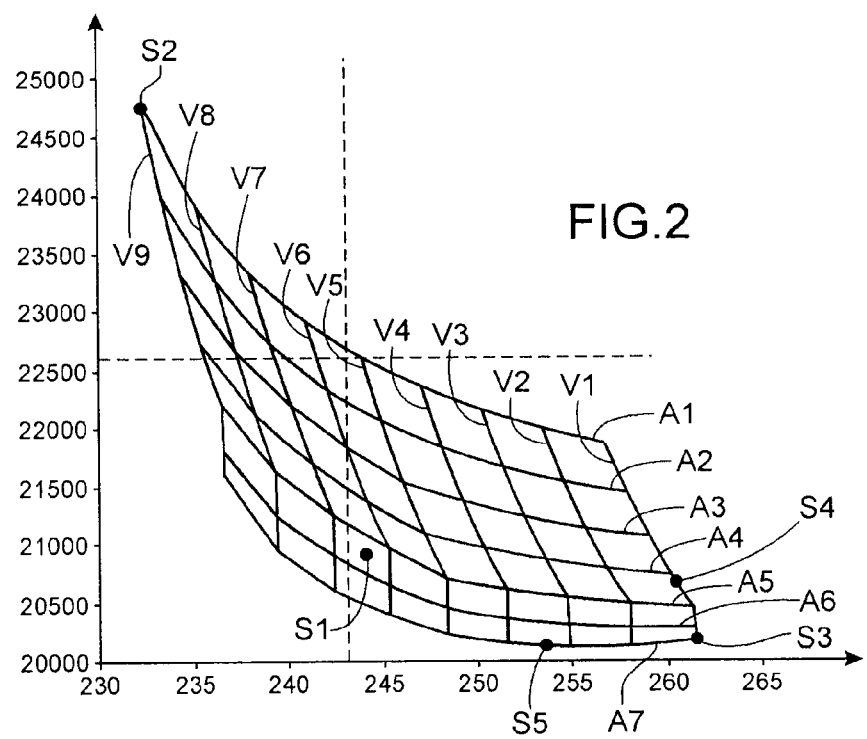
FIG. 2 illustrates an example of relations between the different flight parameters at one point in the flight plan.

FIG. 2 illustrates an example of relations between the different flight parameters at a particular waypoint in the flight plan. More particularly, this example shows an array of characteristics corresponding to correlations between fuel quantity and time, parameterised by the different speed and altitude profiles.

According to this example, the ordinate axis corresponds to the quantity of fuel in kg consumed on arrival, and the abscissa axis corresponds to the transit time remaining in minutes. This example shows that the time lies between the values of 223 minutes and 262 minutes, and the quantity of fuel consumed lies between the values of 20,100 kg and 24,700 kg.

The horizontal curves represent the array of characteristics between the quantities of fuel remaining and time parameterised by the quantity of altitude in feet (ft). Thus, the horizontal curves A1 through A7 correspond to the altitudes of 32,000 ft (9,753.6 m); 33,000 ft (10,058.4 m); 34,000 ft (10,363.2 m); 35,000 ft (10,668 m); 36,000 ft (10,972.8 m); 37,000 ft (11,277.6 m); and 38,000 ft (11,582.4 m) respectively.

The vertical curves represent the array of characteristics between the quantities of fuel quantity and time parameterised by the quantity of speed expressed as Mach number (Ma). Thus, the vertical curves V1 through V9 correspond to speeds of Ma 0.76; Ma 0.77; Ma 0.78; Ma 0.79; Ma 0.80; Ma 0.81; Ma 0.82; Ma 0.83; and Ma 0.84 respectively.

For example, if the fuel quantity is set to 22,600 kg and the time, to 243 minutes, the intersection of the two dotted lines is reached, which sets the speed at Ma 0.809 and the altitude at 32,400 ft (10,363.2 m). If, on the other hand, only the time is set to 243 minutes, the fuel can vary between 20,600 kg and 22,800 kg, the altitude can vary between all the horizontal curves A1 through A7 (that is between the values of 32,000 ft and 38,000 ft), and speed can vary approximately between the curves V5 and V7 (more exactly, between the values of Ma 0.808 and Ma 0.821).

Thus, at every instant in the flight, a domain of definition like that illustrated in FIG. 2 can be used to define and display the variation intervals of the four flight parameters.

In fact, the interface means 9 are configured to supply at least one envelope of values of the flight parameters at least one reference point among the waypoints. The reference point can correspond to the destination point of the aircraft, selected for example by default by the on-board system, or to any point in the route selected by the crew.

Figure 3:
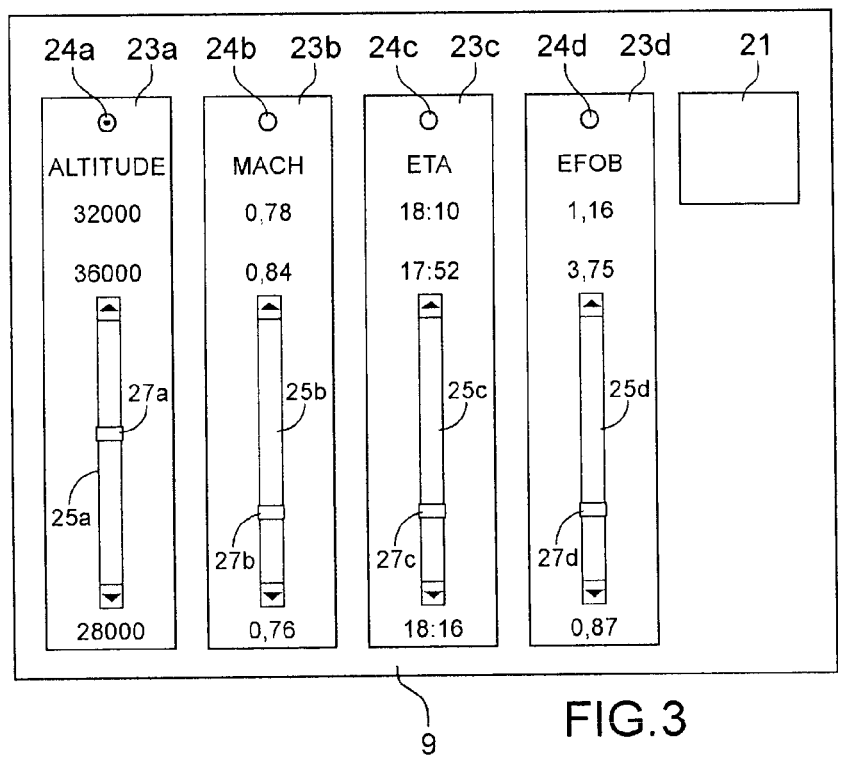
FIG. 3 illustrates an example of the interface means of the system of FIG. 1.

FIG. 3 illustrates an embodiment of interface means 9 representing an envelope of values of the flight parameters at a reference point.

This example shows that interface means 9 include a selection means 21 for selecting the reference point and input-output means 23*a*, 23*b*, 23*c*, and 23*d* associated with the flight parameters corresponding to altitude, speed, transit time and quantity of fuel remaining at the selected reference point. Each of the input-output means 23*a* through 23*d* includes an interval or spread of values 25*a* through 25*d* of the corresponding parameter and an index or a cursor 27*a* through 27*d* configured to set or to mark a value within the interval.

This particular example is given in the case where the reference point corresponds to the destination point of the aircraft and shows that the altitude, which can vary between the values of 28,000 ft (8,534.4 m) and 36,000 ft (10,972.8 m), is set to the value 32,000 ft (9,753.6 m). This fixed altitude value limits the variation of the other parameters such that the speed varies between the values of Ma 0.76 and Ma 0.84, the ETA (Estimated Time of Arrival) varies between the values of 17:52 and 18:16 (indicated here in hours), and the quantity of fuel remaining at destination EFOB (Estimated Fuel On Board) varies between the values of 0.87 tonnes and 3.75 tonnes. The corresponding parameter intervals constitute the envelope of values of these parameters which is representative of a domain of definition of a plurality of flight strategies.

In addition, the interface means 9 are configured to provide at least one determined strategy defined by determined values assumed by the flight parameters at the reference point.

In fact, the example of FIG. 3 shows that the cursor corresponding to altitude is set to the value of 32,000 ft, and that the cursors corresponding to the parameters speed, time and fuel mark the values Ma 0.78; 18:10; and 1.16 tonnes, respectively.

Further, the interface means 9 are configured to allow the value of a first parameter among the four flight parameters to be selected and set. In response, calculation means 5 take into account the value of the first parameter in generating and allowing interface means 9 to supply another envelope of values of these flight parameters allowing another plurality of possible strategies to be explored. The plurality of flight strategies is calculated with respect to the performance of the aircraft without it being necessary to modify the current flight plan 13, or any other flight plan.

According to a first embodiment, calculation means 5 and interface means 9 are configured so that the first flight parameter is selected and set automatically depending on the specifics of flight plan 13.

According to a second embodiment, calculation means 5 and interface means 9 are configured so that the first flight parameter is selected and set by the crew of the aircraft. The crew can select a first parameter by using one of the radio buttons 24*a* through 24*d* and set its value by operating the corresponding cursor. Naturally, the crew can at any time either change the value of the first parameter to select another one, or select and set the value of another parameter. In any case, when a cursor 27*a* through 27*d* is operated to set the value of a first parameter, the intervals 25*a* through 25*d* associated with the other parameters are modified accordingly to define another envelope of values that can be assumed by the other parameters.

It will be noted that the calculation means 5 determine the envelope of values of the flight parameters dynamically according to the aircraft's progress along the flight plan. In other words, the envelope of values is determined in a way that evolves over time to take into account the restriction of potential strategies as the aircraft gradually approaches its destination.

The interface means 9 are further configured to allow the crew to select and set the value of a second parameter (for example, by operating a second cursor 27*a* through 27*d*) in addition to the first parameter. The second parameter may also be selected automatically. In response, the calculation means 5 take into account the values of the first and second parameters to generate and allow the interface means 9 to provide another determined strategy. In fact, by setting the values of two parameters, there is no degree of freedom left, and a well determined strategy is obtained corresponding to a point in the domain of definition (see FIG. 2).

Thus, the crew of the aircraft can quickly and easily select an optimal strategy by comparing the effects of the different potential strategies.

Several operating modes are offered to the crew. According to first operating modes, the crew can select a predefined strategy (speed-altitude) over all or part of the cruise; the interface means 9 then display the speed and altitude corresponding to the strategy, and the calculation means 5 and interface means 9 determine and display the corresponding predictions (in other words, time of transit and fuel remaining) at the point in the flight plan selected by the crew.

In fact, according to these first operating modes, the first parameter selected and set can be any one of the parameters corresponding to the altitude and the speed of the aircraft along the flight plan 13. The second parameter selected and set then corresponds to the other of the two parameters corresponding to the altitude and the speed. For example, altitude can first be set, and then speed, or vice versa. This makes it possible to provide a strategy for a transit time and a quantity of fuel remaining at the selected reference point (for example, at the destination point) that satisfies the set values of altitude and speed along the flight plan 13.

Thus, the crew can, for example, compare at the destination point the different possibilities for arrival time and quantities of fuel remaining resulting from different potential values of speed and altitude. The active flight plan 13 is updated only after the crew has selected the optimal (speed and altitude) strategy.

According to second operating modes, the crew can select a time of transit at a point in the flight plan 13 and a fuel quantity at the same point in the flight plan 13 or at another point. Consequently, calculation means 5 and interface means 9 determine and display the optimal speed and altitude over all or part of the cruise, allowing the arrival time or fuel quantity specified by the crew to be satisfied.

In fact, according to these second operating modes, the first parameter selected and set corresponds to any one of the parameters corresponding to a transit time and to a quantity of fuel remaining at a selected reference point. The second parameter selected and set then corresponds to the other of the parameters corresponding to the transit time and to the quantity of fuel remaining at the same reference point or at another reference point. This makes it possible to provide a strategy for a profile of the parameters corresponding to the speed and the altitude of the aircraft that satisfy the set values of transit time and of quantity of fuel remaining at the selected reference point(s).

According to a first possibility, the first parameter can correspond to a transit time to a reference point and the second parameter, to a quantity of fuel remaining at the same reference point (or possibly at another reference point). In that case, the crew can explore two types of scenarios. A first scenario allows the effect of a delay or a lead on the quantity of fuel remaining to be seen as a function of the altitude-speed strategy. This allows the crew to be able to specify a constraint on time of transit at the reference point and to evaluate for example what additional quantity of fuel must be consumed to recover a delay with regard to the time originally planned, or how much time can be recovered on the time originally planned by consuming a quantity of additional fuel. A second scenario allows the optimal altitude-speed strategy to be identified (that which maximizes the quantity of fuel remaining at the reference point) that makes it possible to satisfy the time constraint.

According to a second possibility, the first parameter can correspond to a quantity of fuel remaining at a reference point and the second parameter to a transit time at the same reference point (or possibly at another reference point). In this case, two types of scenarios can again be explored. A first scenario allows the effect of "over" or "under" consumption of a quantity of fuel on the time of transit to be seen as a function of the altitude-speed strategy. This allows the crew to be able to specify a constraint on the quantity of fuel remaining, and to evaluate how much fuel can be saved if the crew has the possibility of delaying the time of transit at the reference point or otherwise what delay will result with respect to the time originally planned if the crew decides to increase the fuel reserve at the reference point considered. A second scenario makes it possible to identify the optimal altitude-speed strategy (that which minimizes the transit time at the reference point) that allows the constraint on quantity of fuel remaining to be satisfied.

Figure 4:
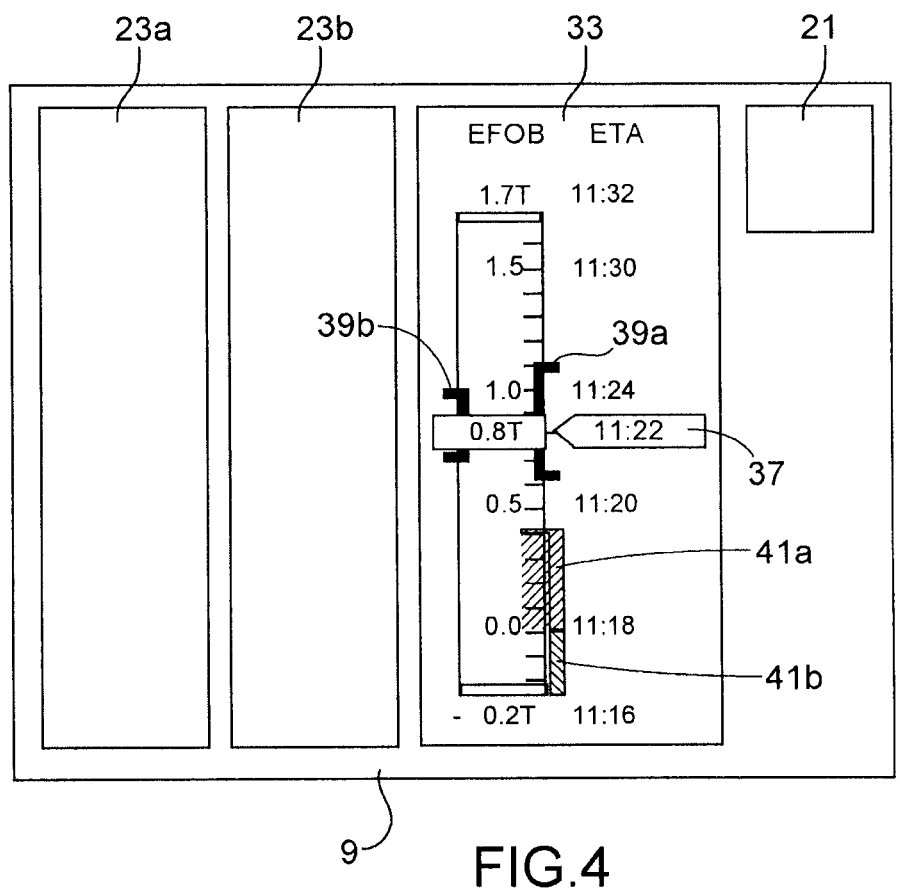
FIG. 4 illustrates another example of interface means of the system of FIG. 1.

FIG. 4 illustrates a variation of the interface means of FIG. 3 which is advantageously suited to the second operating modes described above. The example of FIG. 4 differs from that of FIG. 3 by the fact that two of the input-output means, 23c and 23d, consist of a dual scale 33 on which a cursor 37 is configured to mark/display the time of transit at the reference point and to mark/display the quantity of fuel corresponding to a speed-altitude strategy determined to be optimal.

More particularly, the example of FIG. 4 represents a dual scale indicating a correlation between the estimation of fuel remaining at destination and the estimated time of arrival EFOB/ETA. The scale shows prescribed tolerances 39a and 39b supplied by the aircraft's company based on fleet management objectives (passenger connections, crew service hours, etc.). A first prescribed range 39a for ETA and a second prescribed range for EFOB. According to this particular example, cursor 37 displays an arrival time of 11:22 with a prescribed tolerance of approximately plus or minus two minutes and marks an EFOB of 0.8 tonnes with a prescribed tolerance of plus two hundred kilograms or minus one hundred kilograms.

Furthermore, the dual EFOB/ETA scale shows the limiting values of fuel. A first band 41a in a first colour (in amber, for example) indicates a time value spread where the fuel quantity remaining is less than the minimum value defined in the flight management system 11 (MIN DEST FOB). A second band 41b in another colour (in red, for example) indicates a time value spread where the flight strategy does not allow regulation reserve requirements to be met.

The interface means 9 according to the example of FIG. 4 allow the crew to select and to set the value of a first parameter of either altitude 23a or speed 23b and to move the cursor 37 on the dual scale 33 so as to specify a given time of transit (to which, for a given strategy, corresponds a quantity of fuel remaining). Consequently, the interface means 9 indicate the optimal speed, altitude and fuel quantity that allow the time of transit marked on the dual scale 33 to be achieved.

As the dual scale 33 is also graduated in quantity of fuel remaining, the crew can also evaluate the effect of the use of part of the fuel reserve on the time of transit by moving the cursor 37 to a given value of fuel quantity remaining. The interface means 9 then indicates the time of transit and the optimal speed-altitude strategy that allows it to satisfy the fuel limit thus specified.

In addition, if the crew changes the strategy (either by choosing a new determined strategy or by constraining flight speed and altitude), the calculation means 5 will interpolate the new values of time of transit and fuel quantity and the cursor 37 will move on the scale 33 according to the new strategy.

According to third operating modes, the interface means 9 are configured to allow selection of a predefined strategy in which the selection and setting of the values of the first and/or second parameters are predetermined. This predefined strategy can be selected from among a plurality of predefined strategies. FIG. 2 illustrates the location of points S1 through S5 corresponding to strategies predetermined on the domain of definition.

The first (referenced by point S1) corresponds to a strategy of operating cost minimization (ECON) according to a predetermined Cost Index (specified, for example, by the crew). This first strategy S1 of operating cost minimization can advantageously be a strategy selected automatically by default, by the on-board system 1 itself.

The second (referenced by point S2) is a flight time minimization strategy (MIN TIME) based on fuel available on board, The third (referenced by point S3) is a range maximization strategy (MAX RANGE).

The fourth (referenced by point S4) is a compromise strategy between maximum range and fuel savings (Long Range Cruise or LRC).

The fifth (referenced by point S5) is a strategy for minimizing fuel consumption per nautical mile (MAX ENDURANCE).

Selecting a strategy allows the two corresponding parameters corresponding to altitude and speed to be set, as illustrated in FIG. 2.

As previously stated (first and second operating modes), the crew also has the possibility of manually setting speed, altitude, transit time, or fuel quantity to a constant value (for example, to satisfy an air traffic control directive or a requirement of the aircraft's company).

Figure 5:
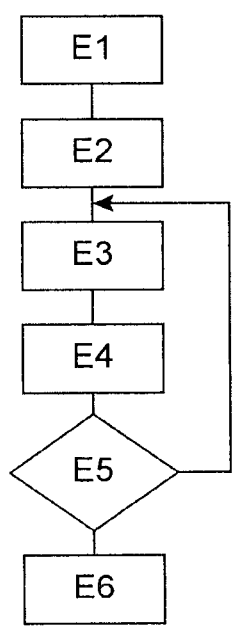
FIG. 5 is a flowchart illustrating the different steps which can be carried out by the processing means of the system of FIG. 1.

FIG. 5 is a flowchart illustrating the different steps that can be carried out by the processing means 3 of the on-board evaluation system 1, according to the invention. These steps are based on a simplified model of the aircraft's performance based on the definition of rules of thumb that for example allow the arrival time and the fuel quantity at a point in flight plan 13 to be estimated for different flight profiles. For each altitude profile tested, the principle consists of establishing a relation between the flight time and the quantity of fuel consumed (or remaining in the aircraft) by varying the speed (the cost index).

Depending on the problem specified by the crew, the on-board evaluation system's flowchart uses the set of time-fuel relations obtained to answer the problem.

For example, the flowchart uses the time-fuel relations to interpolate the arrival time and the quantity of fuel remaining at a point in flight plan 13 depending on a flight strategy (constrained altitude profile and/or speed) defined by the crew.

Conversely, the flowchart can use the set of time-fuel relations to identify the best strategy for satisfying the time of transit and/or fuel quantity constraints specified by the crew.

The first step E1 consists of calculating the data pertaining to the climb phase. It is possible, for instance, to use tabulated data to directly evaluate flight time (CLB_Time), distance traveled (CLB_Dist) and quantity of fuel consumed (CLB_Fuel) between the current position and the end of the climb phase (Top of Climb).

It is also possible to use the First Law of Motion to carry out an integration of the trajectory.

An analytical model can also be used, or a simplified model based on the current mass, the atmosphere, the current altitude, as well as an additional parameter corresponding to the climb rate.

Steps E2 through E5 consist of calculating data pertaining to the cruise phase.

The cruise phase can consist of one or more segments with different speeds and/or altitudes.

The cruise distance is calculated by subtracting the climb phase (CLB_Dist) and descent phase (DES_Dist) distances from the total distance (Total_Dist) remaining to be travelled to arrive at destination.

It is however necessary to implement an iterative process because the descent phase distance is not yet known, and it is necessary to know the mass of the aircraft at the end of the cruise phase, hence the length of the cruise phase, to estimate the length of the descent phase.

Thus, step E2 consists of initiating the calculation with descent distance set to zero by default (DES_Dist=0).

In step E3, a first estimate (or overestimate) of the cruise distance CRZ_Dist is obtained, given by the following formula:

$$CRZ\_Dist = Total\_Dist - CLB\_Dist - DES\_Dist.$$

The cruise time (CRZ_Time) and the quantity of fuel consumed (CRZ_Fuel) can be calculated either in the conventional way by integration of the flight mechanics equations, or using tabulated models, or even using analytical models depending on the performance desired (accuracy-calculation time tradeoff) for the algorithm.

In step E4, the data obtained in the foregoing step allow a first iteration of the aircraft mass at the end of the cruise phase and the length of the descent phase (DES_Dist) to be carried out.

It will be noted that the descent phase extends from cruise altitude to 10,000 ft (3048 m). Flexibility below 10,000 ft is considered to be zero. In fact, below this altitude, speed is limited and the vertical profile is fixed. Distance, time, and fuel consumption data are therefore retrieved from the predictions of the flight management system or FMS. For calculation between cruise altitude and 10,000 ft, the selection is again: integration of the flight mechanics equations ($1^{st}$ Law), tabulated models or analytical models. Mixed solutions can also be contemplated.

The iterations of steps E3 and E4 are continued until the sum of the lengths of the three phases is within a predetermined percentage of the distance to destination.

In fact, step E5 is a test using the following inequality:

$$CLB\_dist + CRZ\_dist + DES\_dist > Total\_Dist.$$

As long as the sum of the lengths of the three phases is definitely greater than the distance to destination, steps E3 through E5 are repeated. If not, iterations are stopped at step E6.

The above calculation of cruise trajectory is parameterised in particular by the altitude and speed over each segment of the cruise. Likewise, the calculation of the descent trajectory is configured by the cruise altitude and the descent speed. It is these parameters that make it possible to obtain the necessary flexibility in the results.

Thus, the processing means 3 of on-board evaluation system 1 can include a computer program (recorded for instance in storage means 7) including code instructions corresponding to the algorithm of FIG. 5 for the implementation of the process according to the invention, when the computer program is executed by the processing means.

The invention claimed is:

1. An on-board flight strategy evaluation system aboard an aircraft, linked to an aircraft flight plan, comprising:
   calculation circuitry configured to determine relations between flight parameters, including parameters of time, of fuel quantity, of altitude and of speed, by establishing correlations between transit time and a quantity of fuel at waypoints in said flight plan according to different profiles of speed and altitude, and
   interface circuitry configured to
   provide at least one envelope of values of said flight parameters at at least one reference point among said waypoints, said at least one envelope of values being representative of a definition domain of a plurality of flight strategies,
   provide at least one determined strategy defined by the determined values assumed by said flight parameters at said at least one reference point,
   allow selection and setting of a value of a first flight parameter among said flight parameters to generate and supply another envelope of values of said flight parameters, to allow exploration of another plurality of possible flight strategies, and
   allow selection and setting of a value of a second flight parameter, in addition to said first flight parameter, to generate and supply another determined flight strategy.

2. An on-board system according to claim 1, wherein said calculation circuitry is configured to determine the envelope of values of said flight parameters dynamically, according to progress of the aircraft along said flight plan.

3. An on-board system according to claim 1 or 2, wherein said calculation and interface circuitry are configured to automatically select and set said first flight parameter depending on specifics of said flight plan.

4. An on-board system according to claim 1, wherein said interface circuitry is configured to allow a crew of the aircraft to select and set one or more of said first flight parameter and said second flight parameter.

5. An on-board system according to claim 1, wherein said interface circuitry is:
   configured so that said first flight parameter selected and set corresponds to any one of the parameters corresponding to an altitude and a speed of the aircraft along said flight plan, and
   configured so that said second flight parameter selected and set corresponds to the other of said parameters corresponding to the altitude and the speed, to allow a strategy for transit time and quantity of fuel remaining at said at least one reference point to be supplied that satisfies a set values of altitude and speed along said flight plan.

6. An on-board system according to claim 1, wherein said interface circuitry is:
   configured so that said first flight parameter selected and set corresponds to any one of the parameters corresponding to a transit time and a quantity of fuel remaining at said at least one reference point, and
   configured so that said second flight parameter selected and set corresponds to any other of said parameters corresponding to the transit time and to the quantity of fuel remaining at said at least one reference point or at another point, to allow a strategy for a parameter profile corresponding to a speed and an altitude of the aircraft to be supplied that satisfies a set values of transit time and quantity of fuel remaining at said at least one reference point.

7. An on-board system according to claim 1, wherein said interface circuitry is configured to allow a predefined strategy in which the selection and setting of the values of said first and second flight parameters are predetermined, said predefined strategy being selected from among the following predefined strategies:
   a first strategy for operational cost minimization according to a predetermined cost index,
   a second strategy for flight time minimization according to an amount of fuel available on board the aircraft,
   a third strategy for range maximization,
   a fourth strategy comprising range and fuel savings, and
   a fifth strategy for minimizing fuel consumption per nautical mile.

8. An on-board system according to claim 1, wherein said interface circuitry is configured to select said at least one reference point and an input-output user-interface associated with the flight parameters corresponding to altitude, speed, time and the quantity of fuel remaining at said at least one selected reference point,
   wherein said input-output user-interface is configured to process an interval of values of a corresponding parameter and has associated therewith at least one cursor configured to set or mark a value in said interval, the intervals of the corresponding parameters constituting said at least one envelope of values of said parameters, and
   wherein, when an index is operated to set the value of said first flight parameter, associated intervals are consequently modified to define said another envelope of values, which can be assumed by other parameters.

9. An on-board system according to claim 8, wherein said input-output user-interface includes a dual scale on which a cursor, of said at least one cursor, is configured to mark/display the time of transit at the at least one reference point and to mark/display the quantity of fuel corresponding to a strategy determined by an optimal speed-altitude.

10. A non-transitory computer-readable storage medium storing computer-readable instructions that, when executed by a computer, cause the computer to perform a process for evaluating flight strategies linked with a flight plan aboard an aircraft, the process comprising:
    determining relations between flight parameters, including the parameters of time, of fuel quantity, of altitude and of speed, by establishing correlations between transit time and a quantity of fuel at waypoints of said flight plan according to different profiles of speed and altitude,
    providing at least one envelope of values of said flight parameters at at least one reference point among the waypoints, said envelope of values being representative of a definition domain of a plurality of flight strategies,
    providing at least one determined flight strategy defined by the determined values assumed by said flight parameters at said at least one reference point,
    selecting and setting a value of a first flight parameter among said flight parameters to generate and provide another envelope of values of said flight parameters to explore another plurality of possible flight strategies, and
    selecting and setting a value of a second flight parameter, in addition to said first flight parameter, to generate and provide another determined flight strategy.

* * * * *